United States Patent Office 3,468,682
Patented Sept. 23, 1969

3,468,682
ALKALINE EARTH OXIDE/FLUORIDE-RARE EARTH OXIDE-SILICON DIOXIDE GLASS COMPOSITIONS
Bhogaraju V. Janakirama-Rao, Philadelphia, Pa., assignor to TRW Inc., a corporation of Ohio
No Drawing. Filed July 1, 1964, Ser. No. 379,706
Int. Cl. C03c 3/10, 5/00
U.S. Cl. 106—52                              2 Claims

ABSTRACT OF THE DISCLOSURE

A vitrified glass consisting of 1 to 50 mole percent of silica and 50 to 99 mole percent of an oxide of a rare earth element and the oxide or fluoride of an alkaline earth element. The rare earth element oxide may be any of the rare earth elements of the lanthanum series of the Periodic Chart and thorium and uranium. The alkaline earth element compound may be that of barium, strontium and calcium. The molar ratio of the rare earth element compound to the alkaline earth element compound being between 3 to 1 and 1 to 2.5.

---

The present invention relates to glass compositions, and more particularly to glass compositions which can contain a relatively large amount of rare earth elements.

Rare earth elements have been used in glasses to achieve glasses having unusual optical properties, such as for wide angle lenses. However, according to the established theories on glass structure, compounds of the rare earth elements are not considered as glass network formers. Any cation with a radius greater than 0.6 Angstrom unit is not considered as glass network former, and all of the rare earth cations have a radius greater than 0.8 Angstrom unit. Therefore, the rare earth elements have been used in glasses only in minor proportions occupying network modifier positions in the structure of the glass. In fact, the solubility of the rare earth oxides in conventional alkalisilicate or borosilicate glasses is limited to 10 to 15 mole percent and renders the glass thermally unstable and subject to being devitrified easily. Additions of greater than 10 to 15 mole percent of a rare earth element modifier to a conventional glass destroys the glass formation.

It is an object of the present invention to provide a novel glass composition containing a rare earth element as a glass former.

It is another object of the present invention to provide a glass composition which can contain a relatively large percentage of a rare earth element.

It is a further object of the present invention to provide a glass composition consisting of a rare earth element, an alkaline earth element and silica.

Other objects will appear hereinafter.

The invention accordingly comprises a composition of matter possessing the characteristics, properties, and the relation of constituents which will be exemplified in the composition hereinafter described, and the scope of the invention will be indicated in the claims.

I have discovered that a glass can be formed by reacting together at a temperature greater than approximately 1600° C., the oxide or fluoride of one of the rare earth elements, the oxide or fluoride of one of a certain group of the alkaline earth elements and silica. The rare earth elements which can be included in the glass of the present invention include not only those of the lanthanum series, i.e., lanthanum, cerium, praseodynium, neodymium, promethium, samarium, europium, gadolinium, terbium, dysprosium, holmium, erbium, thulium, ytterbium, and lutetium, but also thorium and uranium. The alkaline earth elements which can be used in the glass of the present invention are barium strontium, and calcium. More particularly, the glass of the present invention comprises the following:

Silica ($SiO_2$) _____ mole precent__ 1 to 50
RX+AX _____ do____ 50 to 99
Ratio of RX to AX _____ (9 to 1) to (1 to 9)

Where RX is the oxide or fluoride of one of the rare earth elements and AX is the oxide or fluoride of one of the alkaline earth elements selected from barium, strontium and calcium.

The glasses of the present invention in which the rare earth element and/or the alkaline earth element are present as fluorides have lower melting temperatures and higher Abbe values, but are less stable when reheated to their softening temperature because of the presence of the fluorine ion. The glasses of the present invention in which all the elements are present as oxides have higher melting temperatures and are quite stable to thermal treatment. The melting temperature of the glasses of the present invention increases with increasing concentration of the rare earth element containing compound and decreases with increasing concentration of either the silica or the alkaline earth element containing compound.

To make the glasses of the present invention, the proper proportions of the silica and the oxide or fluoride of the rare earth element and the alkaline earth element are thoroughly mixed together. When the rare earth element and/or the alkaline earth element is to be present in the glass as the oxide, the ingredient may be introduced as the nitrate, carbonate, oxalate or other well known compound which will produce the oxide when heated. The mixture of the ingredients is then heated to its melting temperature in a container which will withstand the melting temperature without contaminating the glass. For those glasses having a melting temperature of up to 1800° C., the mixture is melted in a rhodium metal crucible. For those glasses of the present invention having a melting temperature greater than 1800° C., the mixture is melted by placing a charge of the mixture on a silica plate and directing the flame of an oxyacetylene torch into the charge. The charge acts as its own crucible, with the glass being formed in the center of the charge.

The following table shows some examples of the glasses of the present invention along with certain characteristics and properties of the glasses, such as color, refractory index and melting temperatures.

| Glass composition | | Mole Percent Content | | | | Refractory index | Melting Temperature, ° C. |
|---|---|---|---|---|---|---|---|
| AX | RX | $SiO_2$ | AX | RX | Color of glass | | |
| $SiO_2$ ____ $BaF_2$ | $ThF_4$ | 4 | 41 | 55 | Brilliant, colorless _____ | 1.880 | >2,000 |
| $SiO_2$ ____ BaO | $ThO_2$ | 15 | 50 | 35 | _____do_____ | 1.720 | 1,800 |
| $SiO_2$ ____ $CaF_2$ | $ThO_2$ | 12 | 52 | 36 | _____do_____ | 1.710 | 1,800 |
| $SiO_2$ ____ SrO | $La_2O_3$ | 35 | 45 | 20 | Colorless _____ | 1.660 | 1,600 |
| $SiO_2$ ____ CaO | $La_2O_3$ | 35 | 45 | 20 | _____do_____ | 1.650 | 1,600 |
| $SiO_2$ ____ BaO | $La_2O_3$ | 35 | 45 | 20 | Light yellow _____ | 1.670 | 1,600 |
| $SiO_2$ ____ $BaF_2$ | $La_2O_3$ | 15 | 55 | 30 | Brilliant, colorless _____ | 1.725 | 1,600 |
| $SiO_2$ ____ $BaF_2$ | $CeO_3$ | 15 | 55 | 30 | Amber _____ | 1.730 | >2,000 |
| $SiO_2$ ____ $BaF_2$ | $Pr_2O_3$ | 15 | 55 | 30 | Bright green _____ | 1.725 | 1,800 |
| $SiO_2$ ____ $BaF_2$ | $Nd_2O_3$ | 15 | 55 | 30 | Violet _____ | 1.725 | 1,800 |
| $SiO_2$ ____ $BaF_2$ | $Sm_2O_3$ | 15 | 55 | 30 | Brilliant yellow _____ | 1.725 | 1,800 |

| Glass composition | | Mole Percent Content | | | Color of glass | Refractory index | Melting Temperature, °C |
|---|---|---|---|---|---|---|---|
| AX | RX | $SiO_2$ | AX | RX | | | |
| $SiO_2$ | $BaF_2$ | $Ew_2O_3$ | 15 | 55 | 30 | Dark amber | 1.725 | 1,800 |
| $SiO_2$ | $BaF_2$ | $Gd_2O_3$ | 15 | 55 | 30 | Colorless | 1.730 | 1,800 |
| $SiO_2$ | $BaF_2$ | $Tb_2O_3$ | 15 | 55 | 30 | Light brown | 1.735 | 2,000 |
| $SiO_2$ | $BaF_2$ | $Dy_2O_3$ | 15 | 55 | 30 | Lemon yellow | 1.745 | 2,000 |
| $SiO_2$ | $BaF_2$ | $Ho_2O_3$ | 15 | 55 | 30 | Bright orange | 1.725 | 1,800 |
| $SiO_2$ | $BaF_2$ | $Er_2O_3$ | 15 | 55 | 30 | Bright pink | 1.720 | 1,800 |
| $SiO_2$ | $BaF_2$ | $Tm_2O_3$ | 15 | 55 | 30 | Light green | 1.725 | 2,000 |
| $SiO_2$ | $BaF_2$ | $Yb_2O_3$ | 15 | 55 | 30 | Colorless | 1.735 | 2,000 |
| $SiO_2$ | $BaF_2$ | $Lu_2O_3$ | 15 | 55 | 30 | Brilliant, colorless | 1.735 | 2,000 |
| $SiO_2$ | $BaF_2$ | $ThO_2$ | 15 | 55 | 30 | ___do___ | 1.710 | 1,800 |
| $SiO_2$ | $BaF_2$ | $UO_2$ | 15 | 55 | 30 | Dark amber | 1.710 | >2,000 |
| $SiO_2$ | $BaO$ | $Pr_2O_3$ | 15 | 40 | 45 | Bright green | 1.850 | >2,000 |
| $SiO_2$ | $BaO$ | $Ho_2O_3$ | 15 | 40 | 45 | Bright orange | 1.850 | >2,000 |
| $SiO_2$ | $BaO$ | $Lu_2O_3$ | 15 | 40 | 45 | Brilliant, colorless | 1.850 | >2,000 |
| $SiO_2$ | $BaO$ | $Lu_2O_3$ | 30 | 50 | 20 | ___do___ | 1.690 | 1,800 |
| $SiO_2$ | $BaO$ | $Lu_2O_3$ | 20 | 20 | 60 | ___do___ | 1.91 | >2,000 |

From the above table it can be seen that varying the amount of the rare earth element compound in the glasses of the present invention causes the major variation in the properties of the glasses. The use of the fluorides of the rare earth elements and the alkaline earth elements also causes some variation in the properties of the glasses.

I claim:
1. A vitrified glass consisting of 1 to 50 mole percent of silica and 50 to 99 mole percent of an oxide of a rare earth element selected from the group consisting of the rare earth elements of the lanthanum series of the Periodic Chart, thorium and uranium, and an alkaline earth element compound selected from the group consisting of oxides and fluorides of barium, strontium and calcium, the molar ratio of the rare earth element compound to the alkaline earth element compound being between 3 to 1 and 1 to 2.5.

2. A vitrified glass in accordance with claim 1 having a melting temperature of at least approximately 1600° C.

References Cited

Cleek et al.—"Effect of Fluorides on Infared Transmittance of Certain Silicate Glasses"—J. Amer. Cer. Soc., 42 (1959), pp. 599–603.

Brewster et al.—"Lanthanium and Barium in Glass-Forming Systems," J. Soc. Glass Technology 31 (1947), pp. 153–169.

Vogel et al.—"Structure of Fluoride Glasses," Silikat Tech. 9 (1958), pp. 495–501.

HELEN M. McCARTHY, Primary Examiner

U.S. Cl. X.R.

106—47